US010511215B2

(12) United States Patent
Hartman et al.

(10) Patent No.: US 10,511,215 B2
(45) Date of Patent: Dec. 17, 2019

(54) ELECTROMAGNETIC LAUNCHER WITH CIRCULAR GUIDEWAY

(71) Applicant: HONEYWELL FEDERAL MANUFACTURING & TECHNOLOGIES, LLC, Kansas City, MO (US)

(72) Inventors: Seth Hartman, Kansas City, MO (US); Erik Timpson, Kasas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 197 days.

(21) Appl. No.: 15/833,456

(22) Filed: Dec. 6, 2017

(65) Prior Publication Data

US 2018/0109171 A1 Apr. 19, 2018

Related U.S. Application Data

(63) Continuation of application No. 15/163,924, filed on May 25, 2016, now Pat. No. 10,218,251.

(51) Int. Cl.
*H02K 41/02* (2006.01)
*H02K 41/03* (2006.01)

(52) U.S. Cl.
CPC .......... *H02K 41/02* (2013.01); *H02K 41/031* (2013.01)

(58) Field of Classification Search
CPC ......... H02K 41/031; F41B 6/006; F41B 6/00; F41B 6/003
USPC ................... 310/12.07; 124/3; 89/8
See application file for complete search history.

(56) References Cited

U.S. PATENT DOCUMENTS

| | | | | |
|---|---|---|---|---|
| 4,347,463 A * | 8/1982 | Kemeny | ................ | F41B 6/006 124/3 |
| 2007/0234893 A1* | 10/2007 | Lockner | ................ | F41B 6/003 89/8 |
| 2007/0277668 A1* | 12/2007 | Frasca | ....................... | F41B 6/00 89/8 |
| 2014/0103746 A1* | 4/2014 | Amiet | ..................... | F41B 6/003 310/12.07 |

* cited by examiner

*Primary Examiner* — Thanh Lam
(74) *Attorney, Agent, or Firm* — Hovey Williams LLP

(57) ABSTRACT

An electromagnetic launcher with a closed-loop guideway and conductors for launching a projectile. The projectile is accelerated along the guideway using electromagnetic forces until it reaches a desired speed, then the projectile is launched in a desired direction. The direction of the launch of the projectile is determined by orienting the guideway in the desired direction using an actuator. The guideway may include a door or aperture allowing the projectile to be launched therefrom, tangent to the curvature of the guideway.

20 Claims, 13 Drawing Sheets

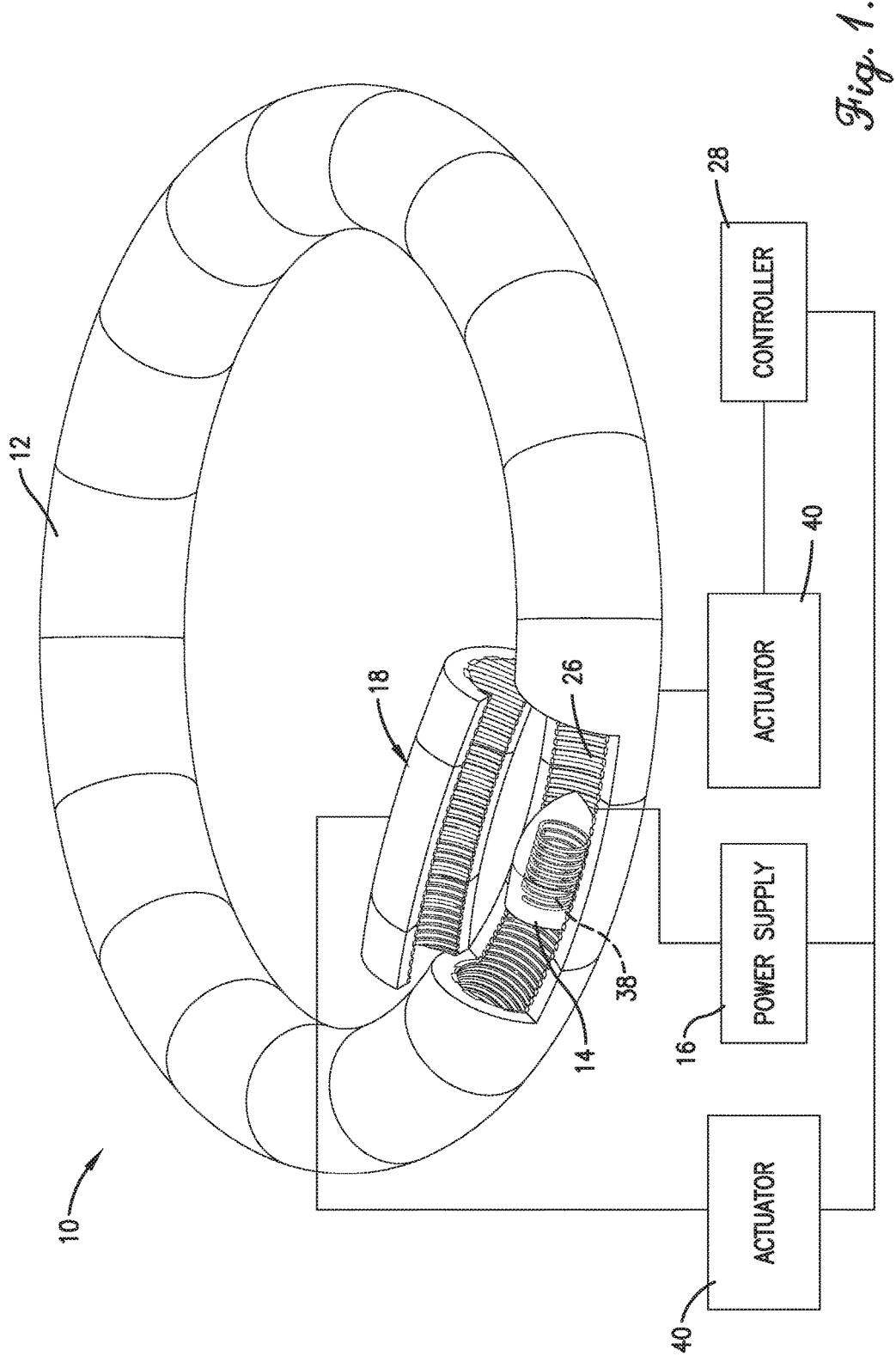

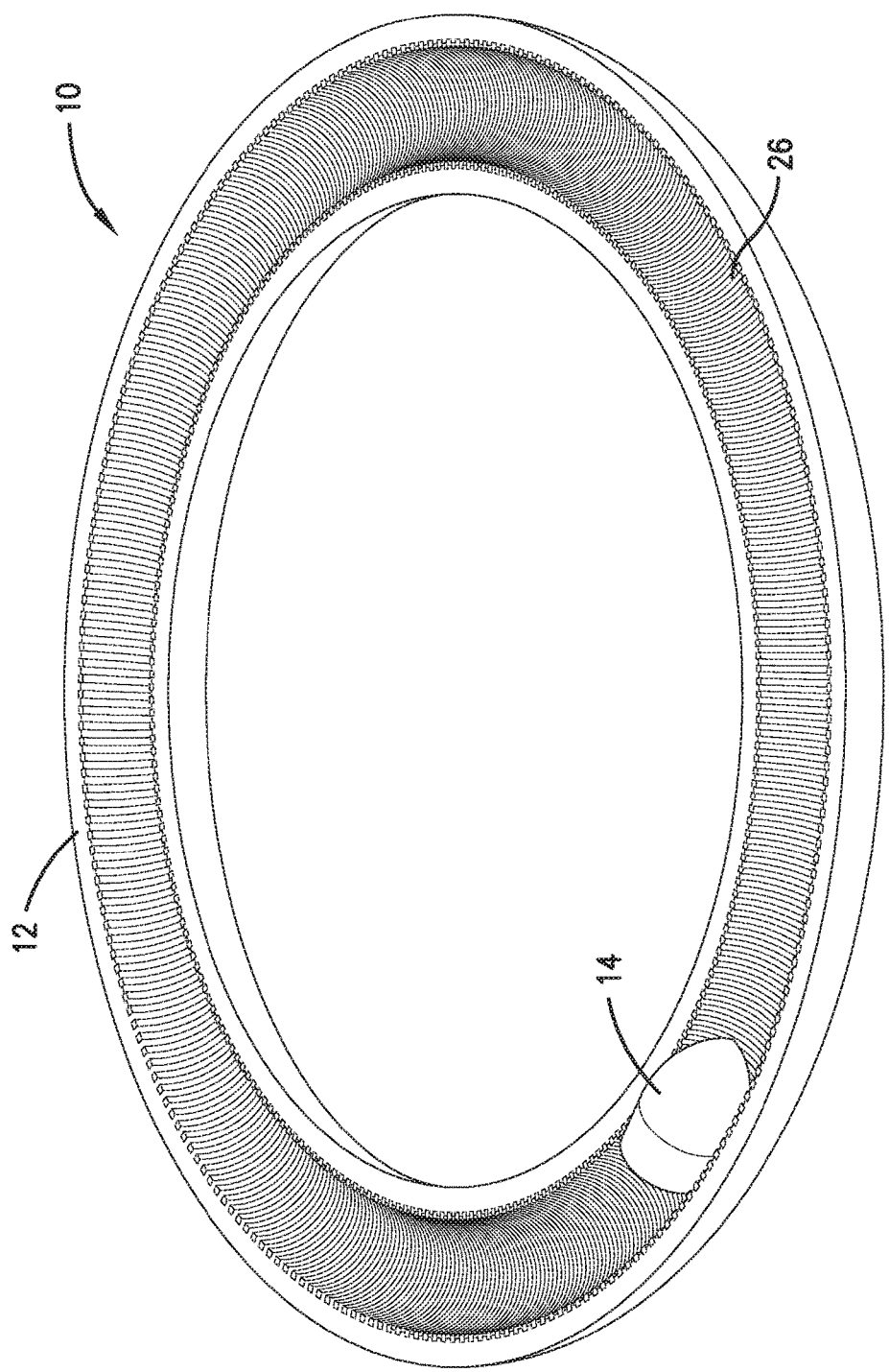

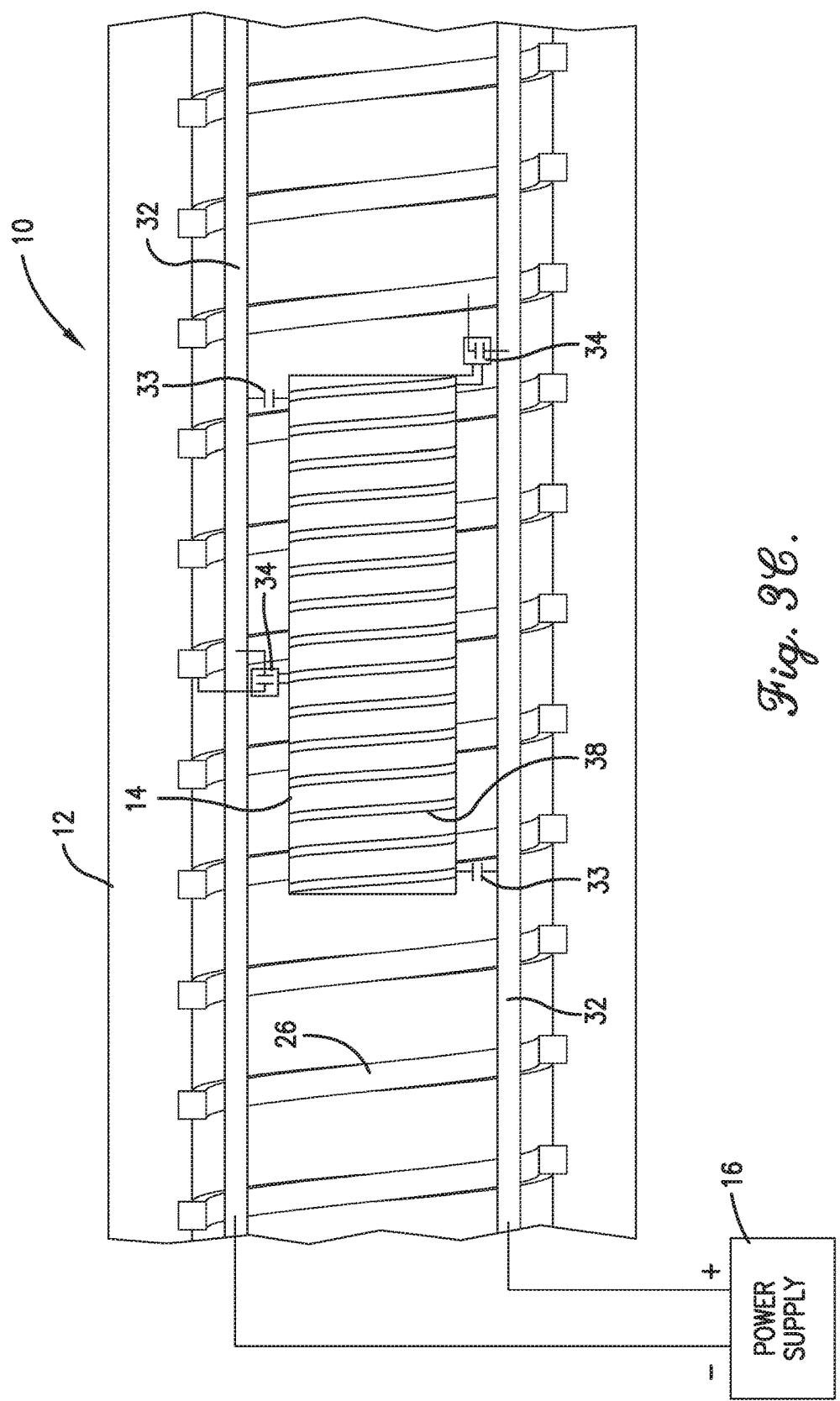

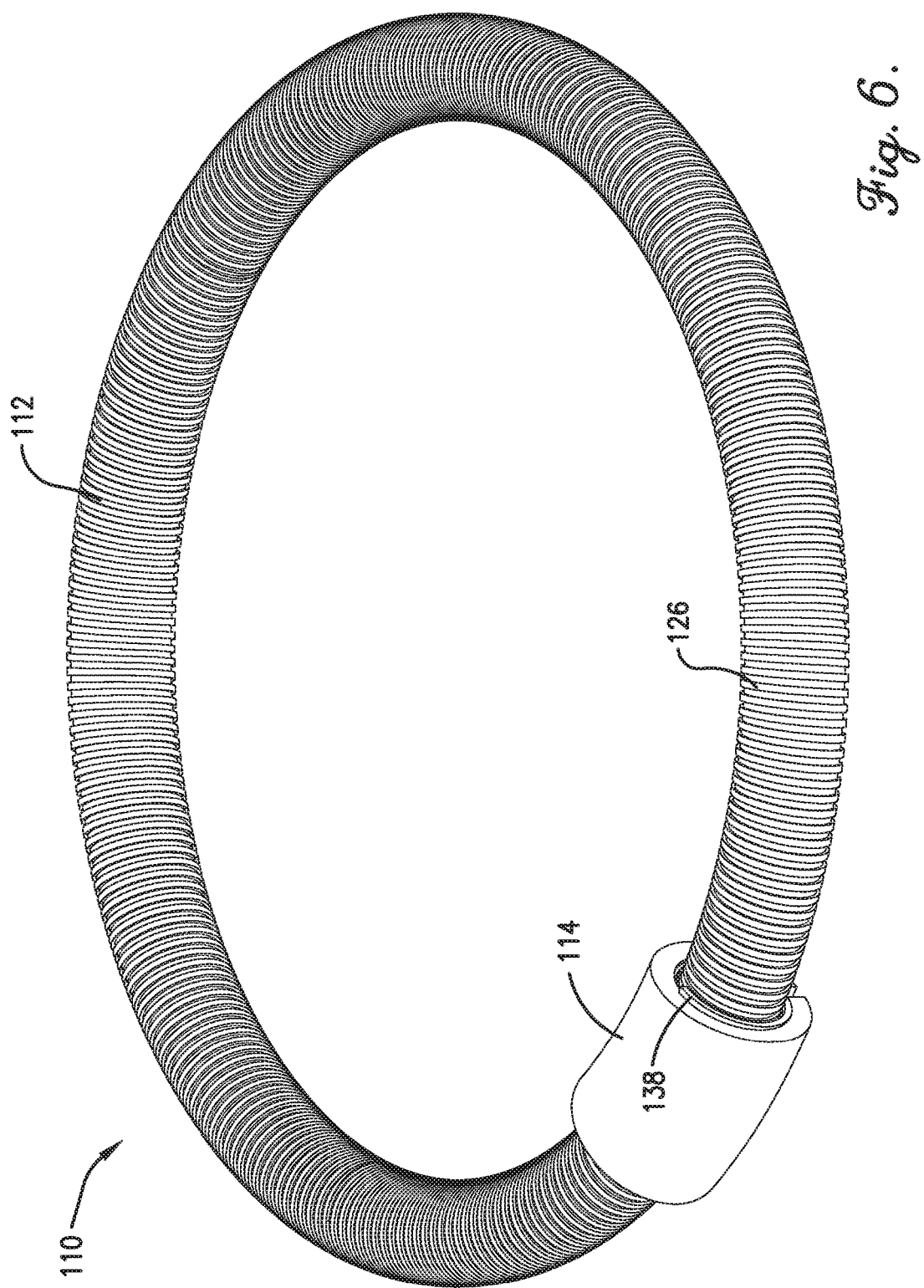

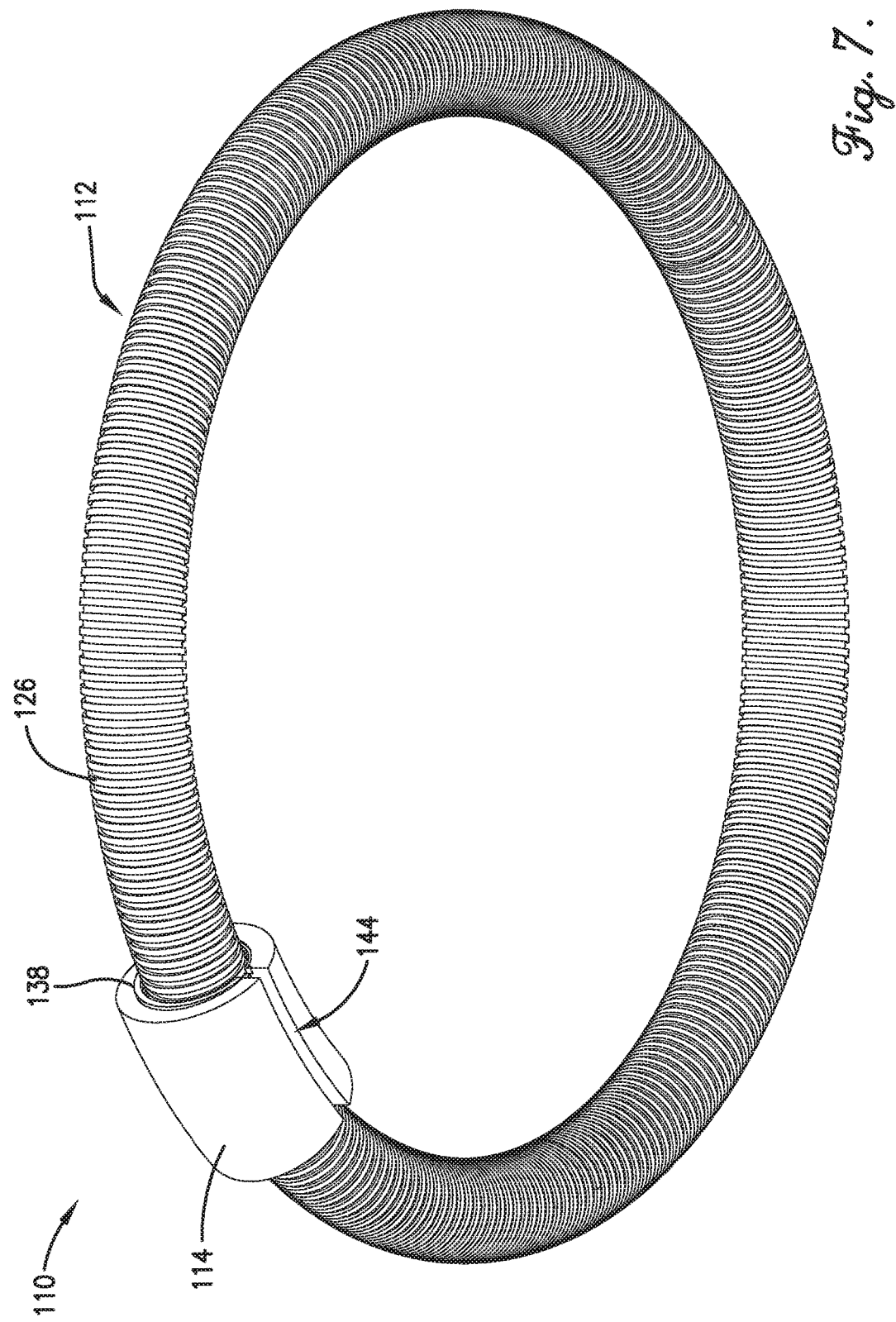

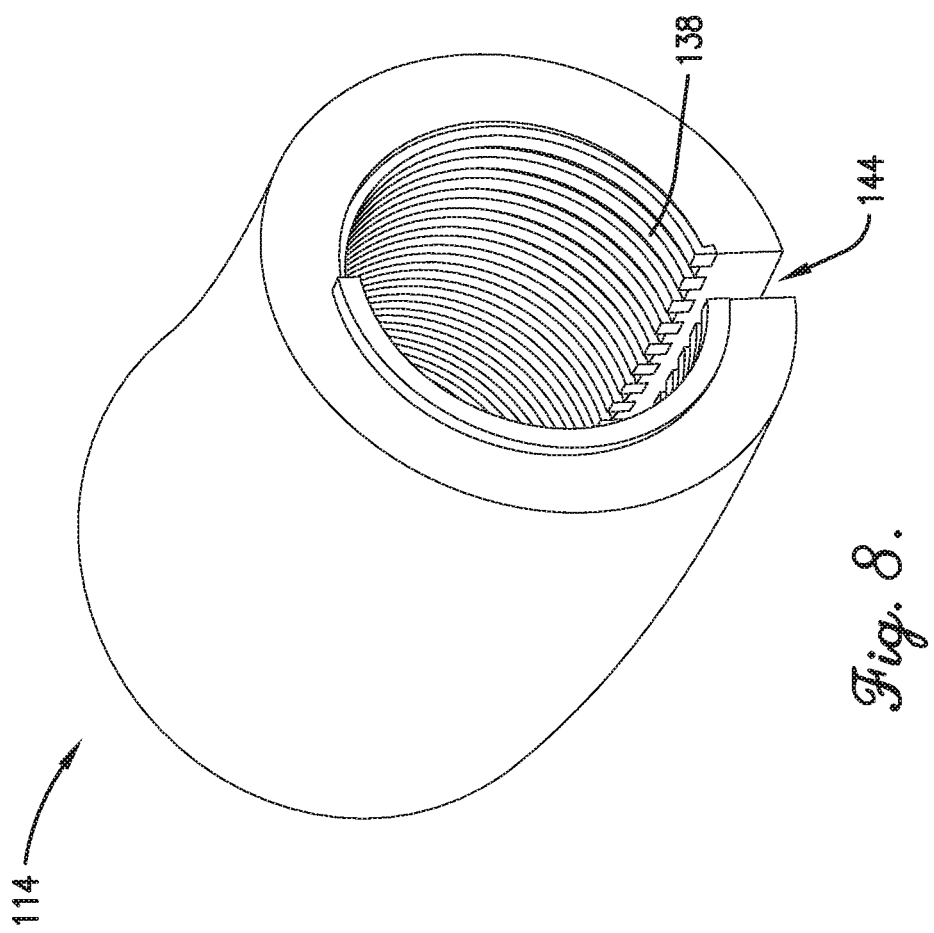

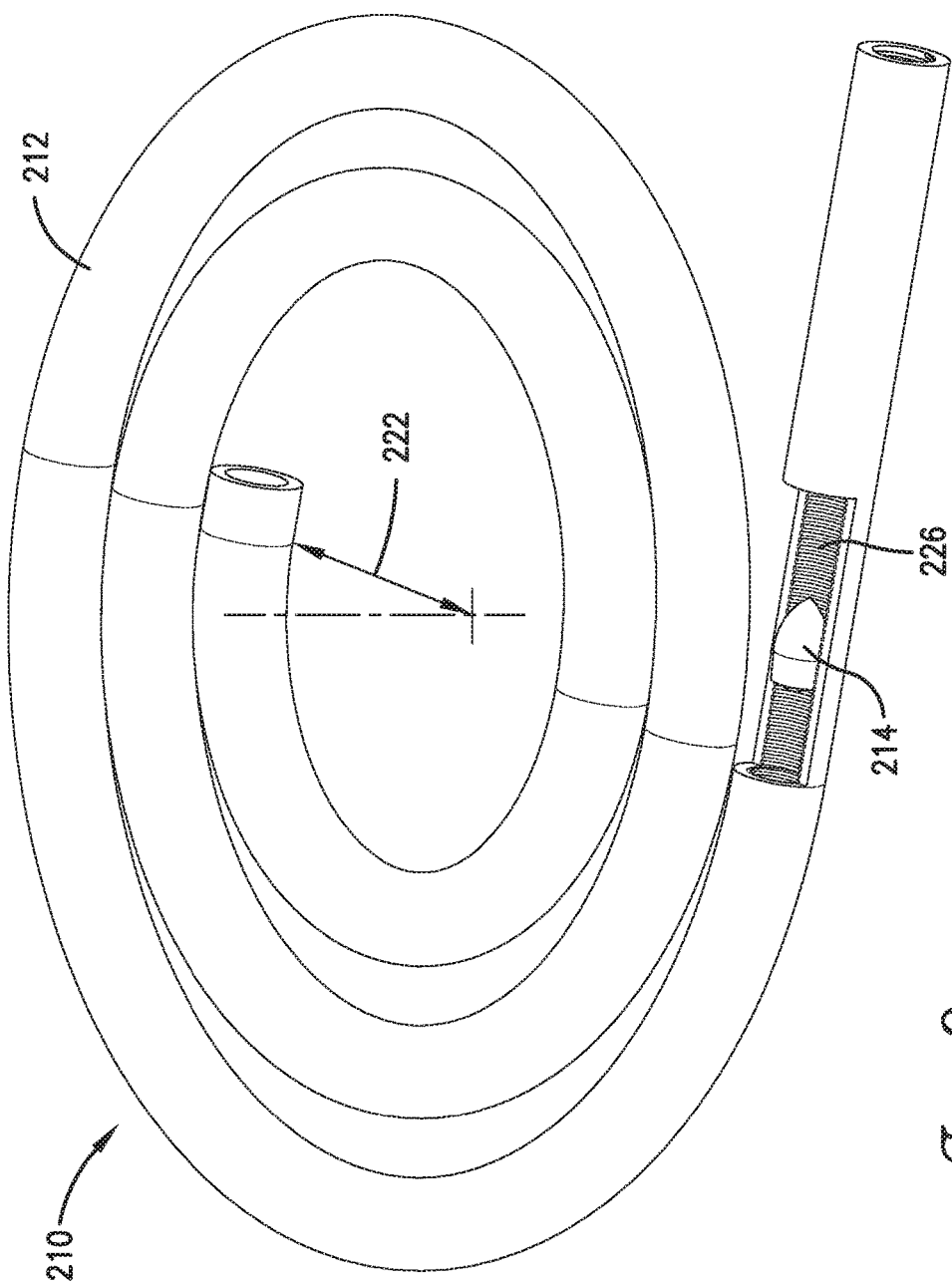

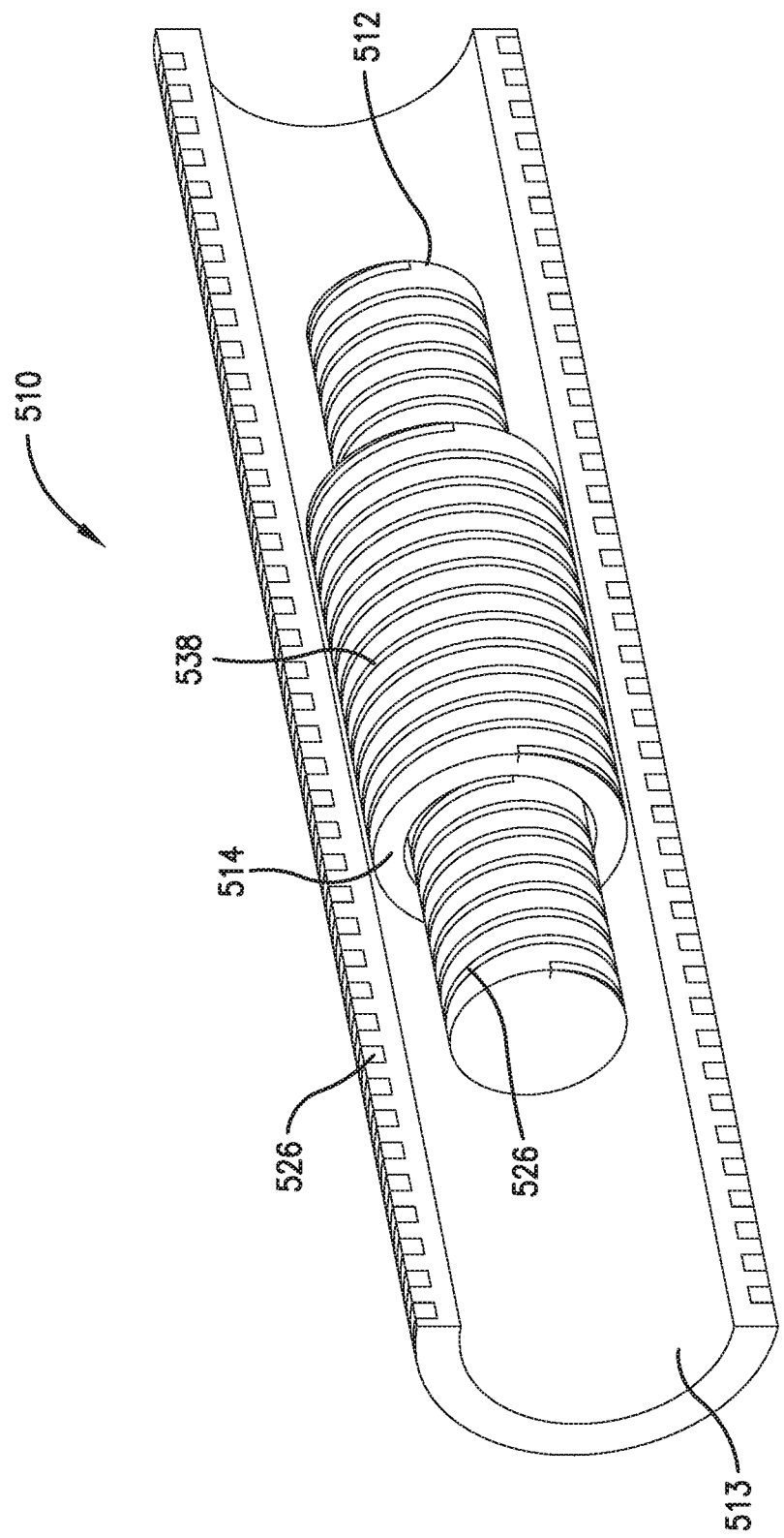

ELECTROMAGNETIC LAUNCHER WITH CIRCULAR GUIDEWAY

RELATED APPLICATIONS

The present application is a continuation application and claims priority of co-pending application titled "Electromagnetic Launcher with Spiral Guideway," Ser. No. 15/163,924, filed May 25, 2016, which is related to co-pending application titled "Electromagnetic Launcher with Spiral Guideway," Ser. No. 15/163,951, filed on May 25, 2016, both of which are incorporated by reference herein in their entirety.

STATEMENT REGARDING FEDERALLY-SPONSORED RESEARCH OR DEVELOPMENT

This invention was made with government support under Contract No.: DE-NA0002839 awarded by the Department of Energy. The government has certain rights in the invention.

BACKGROUND

Electromagnetic launchers convert electrical energy into mechanical propulsion to launch objects such as missiles, aircrafts, space crafts, and other projectiles. Velocities provided by electromagnetic launchers may exceed the velocities provided by other propulsion methods (chemical, mechanical, pneumatic, etc.). However, traditional electromagnetic propulsion methods have been plagued by a number of safety and reliability issues. Furthermore, current electromagnetic launchers require large amounts of electric power, often requiring large capacitor banks and large electromagnetic pulses that can cause interference with other equipment. Current electromagnetic launchers also take up significant space due to long barrel lengths and large capacitor banks, which hinder potential applications in confined areas.

This background discussion is intended to provide information related to the present invention which is not necessarily prior art.

SUMMARY

Embodiments of the present invention solve the above-mentioned problems and provide a distinct advance in the art of electromagnetic launchers. An electromagnetic launcher constructed in accordance with embodiments of the invention may be particularly advantageous in applications that require high speeds and low power consumption and that must fit into a small space and may also aid in the development of linear electromagnetic launchers. An embodiment of the invention is an electromagnetic launcher having a closed-loop guideway, such as a circular guideway, for receiving and accelerating a projectile. The shape and configuration of the guideway allows the projectile to stay within the launcher a longer period of time, thus achieving higher speeds without requiring a longer barrel length. The projectile accelerates along the guideway by way of an electromagnetic force. Specifically, the launcher includes conductive coils in or around the guideway that may be electrically connected to a power supply to create an electromagnetic field along the guideway.

In some embodiments of the invention, the electromagnetic launcher may include a closed-loop or circular guideway and a stator conductor wound around, within, or embedded in the guideway in a first direction forming one or more stator coils. The electromagnetic launcher may be operable to launch a projectile with a rotor conductor wound around, within, or embedded in the projectile in a second direction forming at least one rotor coil. The first direction may be identical or opposite the second direction.

The electromagnetic launcher may further include a pair of rails having a positive rail and a negative rail that are positioned along the guideway and two pairs of connectors. The rails may be positioned on a wall of the guideway toward which a centripetal force is primarily directed so that the centripetal force aids in maintaining contact between the connectors and the rails. The two pairs of connectors may include a first pair of connectors and a second pair of connectors. The first pair of connectors may connect a first end of the rotor conductor to the positive rail and a second end of the rotor conductor to the negative rail so that an electromagnetic field is induced due to a current traveling through the rotor conductor. The second pair of connectors may connect a first end of the stator conductor to the positive rail and a second end of the stator conductor to the negative rail, so that the two pairs of connectors activate only ones of the stator coils close to the projectile, so that an electromagnetic field is induced due to a current traveling through the stator conductor.

In some embodiments of the invention, the launcher may include a toroidal-shaped guideway that accelerates the projectile to a desired speed within the toroid and then launches the projectile, via a launch site, tangent to the guideway in a desired direction. The guideway may include the launch site, which may be a door, hinged wall, or other openable aperture. The launcher may alternatively include a vertically-sloped, spiral-shaped guideway with an increasing radius that points an end of the spiral in the desired direction, and then accelerates a projectile within the guideway so that the projectile launches out the end of the guideway at a desired speed. Additionally, the electromagnetic launcher may include a controller electrically coupled with one or more turns of the stator coils or each turn of the stator coils. Specifically, the controller may selectively activate only the stator coils nearest to the projectile.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

DRAWINGS

Embodiments of the present invention are described in detail below with reference to the attached drawing figures, wherein:

FIG. 1 is a perspective view of an electromagnetic launcher constructed in accordance with an embodiment of the present invention, illustrating a projectile inside of a guideway of the launcher;

FIG. 2 is a perspective view of the electromagnetic launcher of FIG. 1 with a top portion of the guideway removed to illustrate stator coils and the projectile therein;

FIG. 3C is a schematic view of another alternative embodiment of the contact system of the electromagnetic launcher of FIG. 3A;

FIG. 6 is a top perspective view of an electromagnetic launcher constructed in accordance with an alternative embodiment of the present invention;

FIG. 7 is a bottom perspective view of the electromagnetic launcher of FIG. 6;

FIG. 8 is a perspective view of a projectile of the electromagnetic launcher of FIG. 6;

FIG. 9 is a perspective view of an electromagnetic launcher having a spiral configuration according to another embodiment of the present invention;

FIG. 13 is a cross-sectional view of an electromagnetic launcher having an inner and an outer guideway in accordance with one embodiment of the present invention.

Figure 3A:
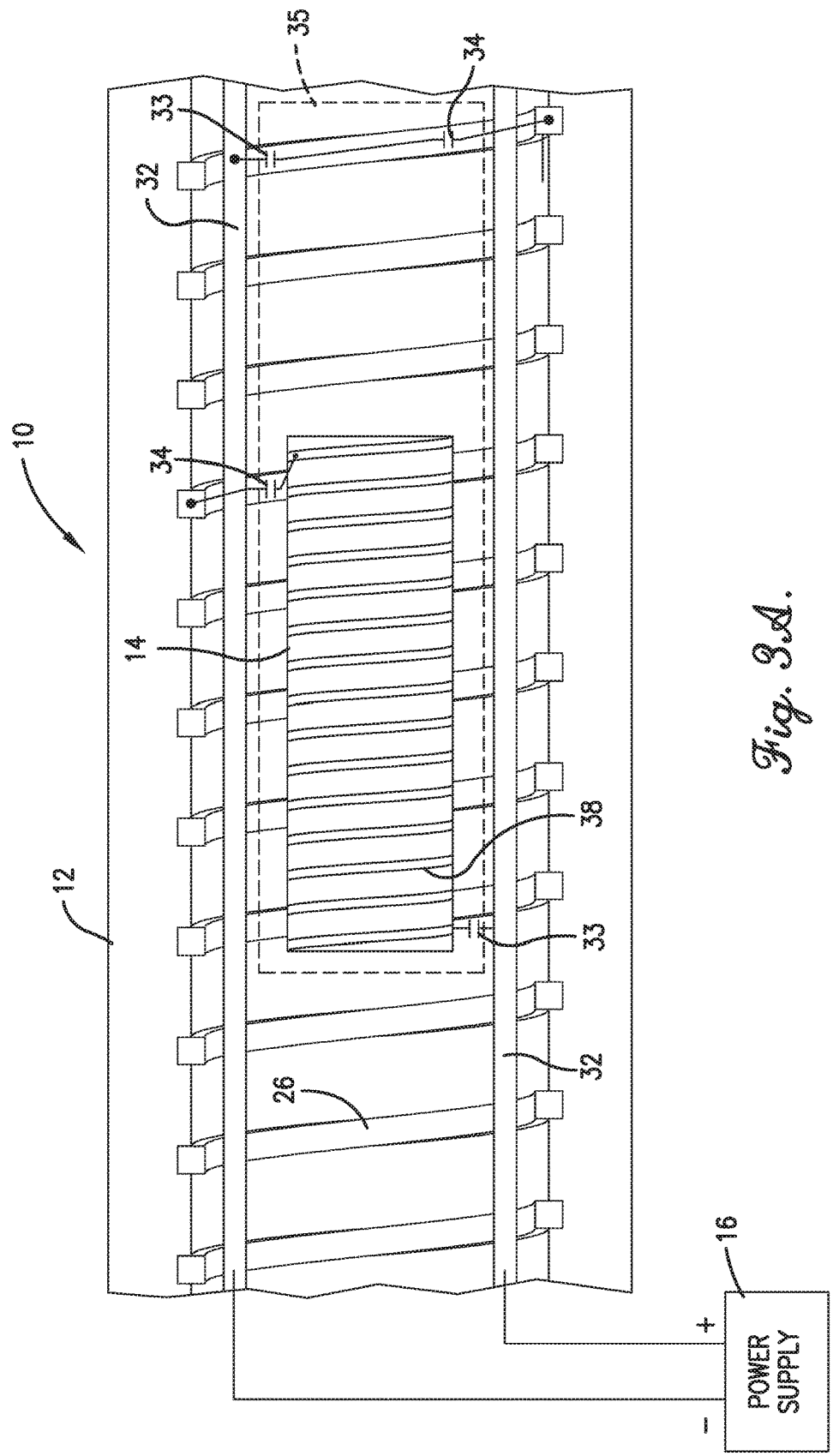
FIG. 3A is a schematic view of a contact system showing the activated contacts of the electromagnetic launcher of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Projectile Inside of Helical Guideway

Some embodiments of the invention, as illustrated in FIGS. 1-5, include an electromagnetic launcher 10 and a method of launching a projectile 14 that is particularly advantageous in applications that require high projectile speeds and low power consumption and that must fit into a small space. As illustrated in FIG. 1, the electromagnetic launcher 10 may comprise a guideway 12 for receiving and launching the projectile 14 and stator coils 26 for generation of an electromagnetic field in or around the guideway 12. The guideway 12 and the stator coils 26 together may form a stator, as illustrated in FIGS. 1 and 2 and described below. The launcher 10 may further comprise actuators 40, a power supply 16, a contact system 30 (as in FIG. 3A), and/or a controller 28.

The guideway 12 may be a channel, such as a hollow tube, having a closed loop. The guideway 12 may be comprised of a strong, non-conducting material, such as concrete, plastics, carbon fiber, ceramic (material), fiberglass, or other non-magnetic materials, depending on the application. The guideway 12 may include one or more walls configured to partially or completely surround the projectile 14 placed therein. The guideway 12 may be in the shape of a toroid, circle, oval, or other closed-loop shape, such as a figure eight or an infinity-symbol shape.

The guideway 12 may also include the launch site 18, as illustrated in FIG. 1, or a plurality of launch sites 18. The launch sites 18 may be a door that opens on one of the walls of the guideway 12 so that the projectile 14 exits tangent to a curvature of the guideway 12. For example, the launch site 18 may comprise a portion of the guideway 12 that is jointed to be disconnected from the rest of the guideway 12. This portion may be configured to be straightened, thus creating a straight path for the projectile 14 to travel and exit out of the guideway 12. The guideway 12 may also comprise a horizontal hinge on a portion or portions of the interior wall of the guideway 12, so that the outside wall of the guideway 12 opens, thus serving as the launch site 18.

The stator coils 26 generate an electromagnetic field in the guideway and may comprise a series of conductors or conductive material. The conductive material of the stator coils 26 may be any material that is known in the art to be conductive of electrical current including but not limited to metals, metal alloys, carbon reinforced metals, copper, silver, aluminum, superconductors, semiconductors, and the like. The stator coils 26 may include individual coils interconnected in series or single loops connectable to a bus with electrical contacts. The stator coils 26 may be placed on an inside surface of the guideway 12, placed on an outside surface of the guideway 12, or embedded within the material of the guideway 12. The stator coils 26 may be powered by the controller 28 selectively connecting the stator coils 26, or sections of stator coils 26, to the power supply 16 or through the contact system 30, as later described herein.

The projectile 14 may be any object that is configured to be launched or otherwise projected at high speeds. The projectile 14 may comprise a solid object and rotor coils 38 wrapped around the solid object. The solid object may comprise a solid, non-conducting material of similar type mentioned above for the guideway 12. The rotor coils 38 may be made of a conductive material wrapped around, wound inside, or embedded within the non-conducting material of the solid object. The conductive material may be of the same kind mentioned above for the stator coils 26. Together the solid object and the rotor coils 38 of the projectile 14 may form a rotor. The rotor coils 38 may include a single rotor coil, pairs of rotor coils, or any number of rotor coils 38. In some embodiments of the invention, the solid object and/or the rotor coils 38 of the projectile 14 may have n number of flattened sections for improved electrical contact via the contact system 30, as later described herein.

In some embodiments of the invention, the projectile 14 may be at least partially cylindrically shaped with a radius smaller than the radius of the guideway 12 so that the projectile 14 travels within the guideway 12, as illustrated in FIGS. 1 and 2. The projectile 14 may take numerous forms for different applications including but not limited to a bullet, artillery shell, missile, transportation vehicle, aircraft, spacecraft, or amusement park ride. The projectile 14 may also be a sled that releasably holds an object to be released and launched in a desired direction at a desired speed. The projectile 14 may be coupled to the contact system 30 of the stator or launcher 10 and the rotor or projectile 14, as described below.

The actuators 40, as schematically illustrated in FIG. 1, may comprise one or more actuators controlled hydraulically, electrically, or manually. For example, the actuators 40 may comprise electric motors, pumps, circuits, robotic components, mechanical actuation components, hydro-mechanical components, electro-mechanical components, and the like. The actuators 40 may be controlled by the controller 28, as further described below. One or more of the actuators 40 may be configured for opening components of the launch site 18 and/or otherwise actuating release of the projectile 14. In some embodiments of the invention, one or more of the actuators 40 may control an orientation of the guideway 12. Specifically, a direction in which the projectile 14 is launched may be controlled by a three-dimensional orientation of the guideway 12, adjusted by rotating the guideway 12 about its center, as well as angling the guideway 12 relative to the ground. The adjusting of the orientation of the guideway 12 may be accomplished manually and/or via the one or more actuators 40.

The power supply 16 may be of any type including a battery, generator, capacitor bank, alternator, power line, solar panel, wind turbine, or any other source of electric power known in the art. The power supply 16 may provide electricity for use by the contact system 30 and/or the controller 28, as later described herein. The power supply 16 may be selectively turned on and off, and/or pathways or switches between the power supply 16 and various conductive components of the electromagnetic launcher 10 may be configured to be selectively opened and/or closed to selectively provide power from the power supply 16.

Figure 3B:
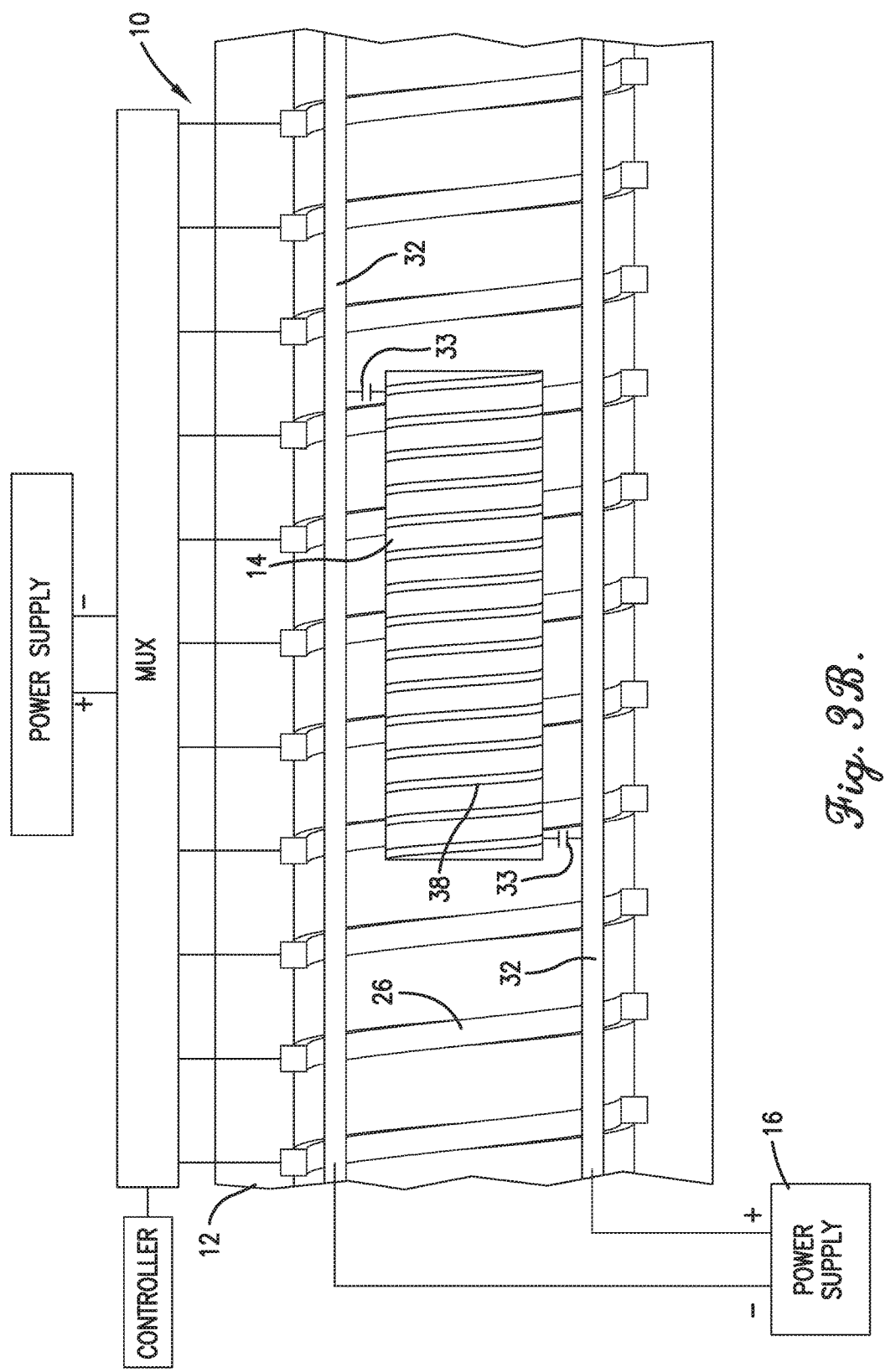
FIG. 3B is a schematic view showing an alternative embodiment of the contact system of the electromagnetic launcher of FIG. 3A using a multiplexer (MUX)

As illustrated in FIG. 3A, the contact system 30 may comprise a pair of rails 32 connected to the power supply 16, and two sets of contacts 33,34. The contact system 30 may further comprise more than two rails 32, and include any number of rails 32 required for a given application. Note that although FIGS. 3A-3C illustrate the guideway 12 and the projectile 14 as substantially linear to schematically show various configurations for the contacts 33,34, the guideway 12 and/or the projectile 14 would be curved in the spiral and circular guideways 12 described herein. Likewise, the rails 32 may also be curved to match the curvature of the spiral or circular guideways 12 described herein.

The rails 32 may be made of any conductive material as described above for the stator coils 26. The pair of rails 32 may broadly be described as a positive voltage rail and a negative voltage rail. The type of electric power that is supplied by these rails can be any form including but not limited to alternating current (AC) power, direct current (DC) power, or pulsed power. The rails 32 may be positioned anywhere on, in, or embedded within the guideway 12. The rails 32 do not have to be placed side by side, but may be on opposite sides of the guideway 12. For example, one of the rails 32 may be located within the guideway 12 on an inner wall closest to a radial center of the guideway 12 while another one of the rails 32 may be located within the guideway 12 on an outer wall furthest from the radial center of the guideway 12. The rails 32 may also be placed at a location on the walls of the guideway 12 at which a centripetal force would be close to or at its maximum when the projectile 14 traverses through the guideway 12, such as a location along the outer wall within the guideway 12. The rails 32 may be connected to the power supply 16, and then provide power to the contacts 33,34 which then provide power to the projectile 14 or to projectile rails (not shown). Alternatively, embodiments without rails may include internal energy storage within the projectile 14.

Figure 4:
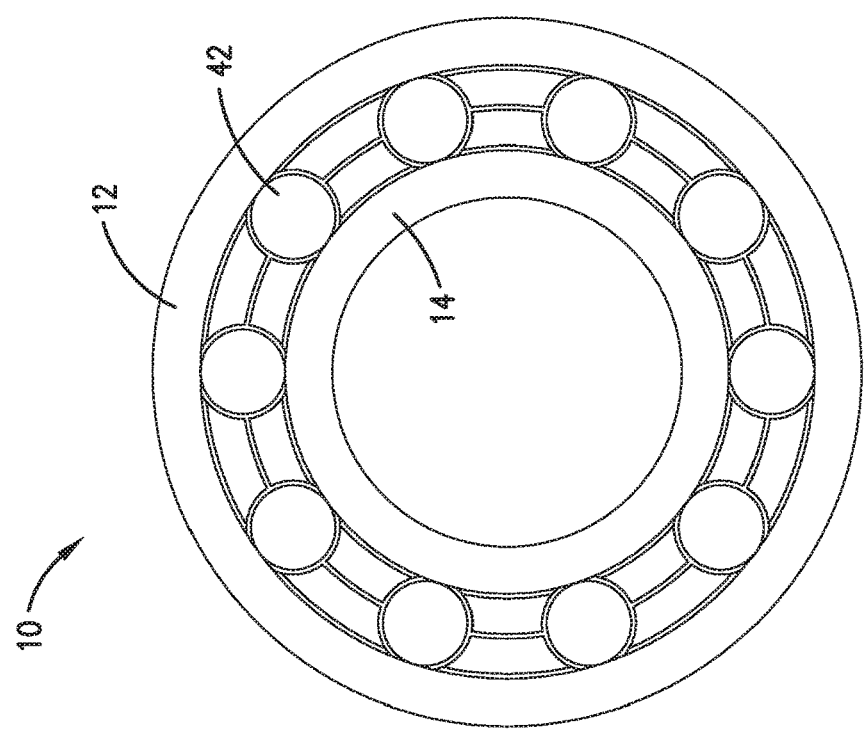
FIG. 4 is a cross-sectional view of the electromagnetic launcher of FIG. 1, illustrating ball bearings that may be used as part of the contact system of FIG. 3A.

As illustrated in FIG. 3A, the contacts 33,34 may comprise one set of contacts 33 for supplying power to the projectile 14 and one set of contacts 34 to supply power to the launcher 10. The contacts 33,34 may be comprised of any number of technologies including but not limited to metal contacts, metal brushes, a track system, interchangeable switches, wheels or bearings, rotating contacts, or any other form of contacts known in the art. The contacts 33,34 may be attached to and ride along with a rotor housing 35 substantially surrounding the projectile 14 and extending a distance fore or aft of the rotor coils 38, such that the contacts 33,34 retain a fixed distance from each other. The location of the contacts 33,34, as illustrated in FIG. 3A, form two magnets having identical or opposite polarity. One of the magnets is formed by the contacts 33,34 at either end of the rotor coils 38 (electrically coupling one of the rails 32 to the rotor coils 38 and then to the stator coils 26) and another of the magnets is formed by a portion of the stator coil 26 between a contact 34 at the end of the rotor coils 38 and contacts 33,34 at the end of the rotor housing 35 (electrically coupling the stator coils 26 with one of the rails 32). The bearings may be ball bearings 42, as illustrated in FIG. 4, or cylindrical bearings. Cylindrical bearings may provide a larger area of contact, particularly against flat surfaces of the rotor coils 38 and/or the stator coils 26. For example, the rotor or projectile 14 may have n number of flattened sections positioned to interface with cylindrical bearings that roll across the flattened sections on each turn of the stator or launcher 10, thereby creating a line of contact, instead of a single point of contact when using ball bearings. In some embodiments of the invention, two sets of bearings may be placed on each end, to always retain contact with the stator coil 26. As illustrated in FIG. 3B, the contacts 34 may be a multiplexor (MUX) that selectively activates the coils via the controller 28. The contacts 34 may also be activated by the controller 28 but receive power through the power supply instead of the rails 32. In some embodiments of the invention, the rails 32 may be omitted and the projectile 14 is internally power (i.e., a battery, generator, or other power supply) or the projectile 14 itself is a permanent magnet.

As illustrated in FIG. 3C, in some embodiments of the invention the projectile 14 may be physically coupled to each of the contacts 33,34 so that both sets of contacts move along with the projectile 14. That is, as the projectile 14 travels along the guideway 12, one pair of the contacts 33 maintains a connection between the rotor coils 38 and the rails 32 and another pair of the contacts 34 maintains a connection between a segment of the stator coils 26 and the rails 32. The contacts 34 may also have a spring or hydraulic system attached to them so that as the projectile 14 travels along the guideway 12, the springs or hydraulic system absorb any physical shock experienced by the projectile 14, preventing electrical disconnect. The contacts 33,34 may further be of the metal ball or cylindrical bearings type so that power can flow from the rails 32, which would act as a track, through the ball or cylindrical bearings and to the stator coils 26 or to the rotor coils 38 of the projectile 14. The configuration of the contacts 32,34 may depend on a direction of the windings of the stator coils 26 and the rotor coils 38. For example, if the windings of the stator coils 26 and the rotor coils 38 are wound in opposite directions, then the contact 34 that connects the launcher 10 (e.g., stator) to the positive rail 32 (positive stator contact) may be located on the same side of the projectile 14 (e.g., rotor) as the contact 33 that connects the projectile 14 to the positive rail 32 (positive rotor contact), and the contacts 33,34 that connect the launcher 10 and projectile 14 to the negative rail 32 (negative stator and rotor contacts) may be located on the opposite side of the projectile 14 as the positive stator and rotor contacts 33,34. This configuration controls the polarity of the electromagnetic field of the projectile 14 and the polarity of the electromagnetic field of the launcher 10. To propel the projectile 14, the polarity of the electromagnetic field of the guideway 10 may be the opposite of the polarity of the electromagnetic field of the projectile 14. To hinder movement of the projectile 14, the polarity of the electromagnetic fields may be the same. Alternatively, as shown in FIG. 3A where the contacts 34 that are shown are the contacts 34 that are activated by the controller 28. This configuration allows the contacts 34 to activate a section of the stator coil 26 in front of the projectile 14 creating an electromagnetic field in a certain direction, while the rotor coils 38 are activated creating an electromagnetic field in substantially the same direction. Thus, the electromagnetic field of the stator coil 26 attracts the electromagnetic field of the rotor coils 38, thereby accelerating the projectile 14 along the guideway 10. Desired polarities of the electromagnetic fields may depend on specific applications and uses of the electromagnetic launcher 10, and configurations of the contacts 33,34 may be used to determine the polarities of the electromagnetic fields.

Alternatively, in place of the contact system 30, the launcher 10 and/or the projectile 14 may comprise magnets, electromagnets, supermagnets, MAGLEV, or other forms of magnetic levitation known in the art in order to levitate the projectile 14 within or around the guideway 12. The projectile 14 may have an internal battery that is connected to the rotor coils 38, supplying power to the rotor coils 38.

The controller 28 may be used to control and/or power various components of the launcher 10. Specifically, the controller 28 may control configurations of the contacts 33,34, the internal battery or other components of the projectile 14, the actuators 40, the selective activation of the stator coils 26, when and/or how much power the power supply 16 provides to the rails 32 and/or coils 26,38, etc. The controller 28 may comprise any number or combination of controllers, sensors, circuits, integrated circuits, programmable logic devices such as programmable logic controllers (PLC) or motion programmable logic controllers (MPLC), computers, processors, microcontrollers, transmitters, receivers, other electrical and computing devices, and/or residential or external memory for storing data and other information accessed and/or generated by the electromagnetic launcher 10. The controller 28 may control and/or sense operational sequences, power, speed, motion, or movement of the actuators 40. Specifically, controller 28 may additionally include and/or be communicably coupled with one or more sensors (not shown). For example, the sensors may send signals indicative of projectile speed to the controller 28.

The controller 28 may be configured to implement any combination of algorithms, subroutines, computer programs, or code corresponding to method steps and functions described herein. The controller 28 and computer programs described herein are merely examples of computer equipment and programs that may be used to implement the present invention and may be replaced with or supplemented with other controllers and computer programs without departing from the scope of the present invention. While certain features are described as residing in the controller 28, the invention is not so limited, and those features may be implemented elsewhere. For example, external databases may be accessed by the controller 28 for retrieving GPS or speed data of the projectile 14 or other operational data without departing from the scope of the invention.

The controller 28 may implement the computer programs and/or code segments to perform various method steps described herein. The computer programs may comprise an ordered listing of executable instructions for implementing logical functions in the controller 28. The computer programs can be embodied in any computer-readable medium for use by or in connection with an instruction execution system, apparatus, or device, and execute the instructions. In the context of this application, a "computer-readable medium" can be any physical medium that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

The residential or external memory may be integral with the controller 28, stand alone memory, or a combination of both. The memory may include, for example, removable and non removable memory elements such as RAM, ROM, flash, magnetic, optical, USB memory devices, MMC cards, RS MMC cards, SD cards such as microSD or miniSD, SIM cards, and/or other memory elements.

In some embodiments of the invention, the controller 28 may further include and/or be coupled to various switching devices. For example, switches may be physically located on each turn of the stator coil 26 and could supply power to any length or region of the stator coil 26 using a computer or the controller 28 to control switching. The switches could also be in an external multiplexor consisting of silicon controlled rectifiers (SCRs), connected to each turn of the stator coil 26. Sensing systems may be configured to keep track of the projectile 14 traveling along/or in the launcher 10, such as optical sensors, or GPS, while the controller 28 controls the timing of the switching, to supply power to the stator coil 26. Once the required switches are closed, the powered section of the stator coil 26 may accelerate, decelerate, maintain the speed, or reverse direction of the projectile 14. A minimum of two switches may be closed on each end of the section the stator coil 26 desired to be energized. If multiple switches are used on each end, only one switch would open on each end at a time. This would allow constant current to flow through the stator coil 26, and help prevent arcing losses, and large switching losses.

In use, the controller 28 may activate the power supply 16, which may supply power to the rails 32. For example, DC power may be supplied to the rails 32. The controller 28 then may activate the contacts 33,34, causing them to electrically connect the stator coils 26 and the rotor coils 38 to the rails 32. As current travels through the stator coils 26 and rotor coils 38, two electromagnetic fields may be created that interact, causing the projectile 14 to accelerate along the guideway 12. The projectile 14 may continue to accelerate until a desired speed is achieved and/or sensed by the controller 28 (e.g., sensors may send signals indicative of projectile speed to the controller 28). Once the desired speed is sensed, the controller 28 may then command one of the actuators 40 that orients the guideway 12 to orient the guideway 12 in a desired position for releasing the projectile 14 in a desired direction. Then the controller 28 may command the desired launch site 18 to open, via one of the actuators 40, so that the projectile 14 exits the guideway 12, tangent to the guideway 12, in the desired direction.

Figure 5:
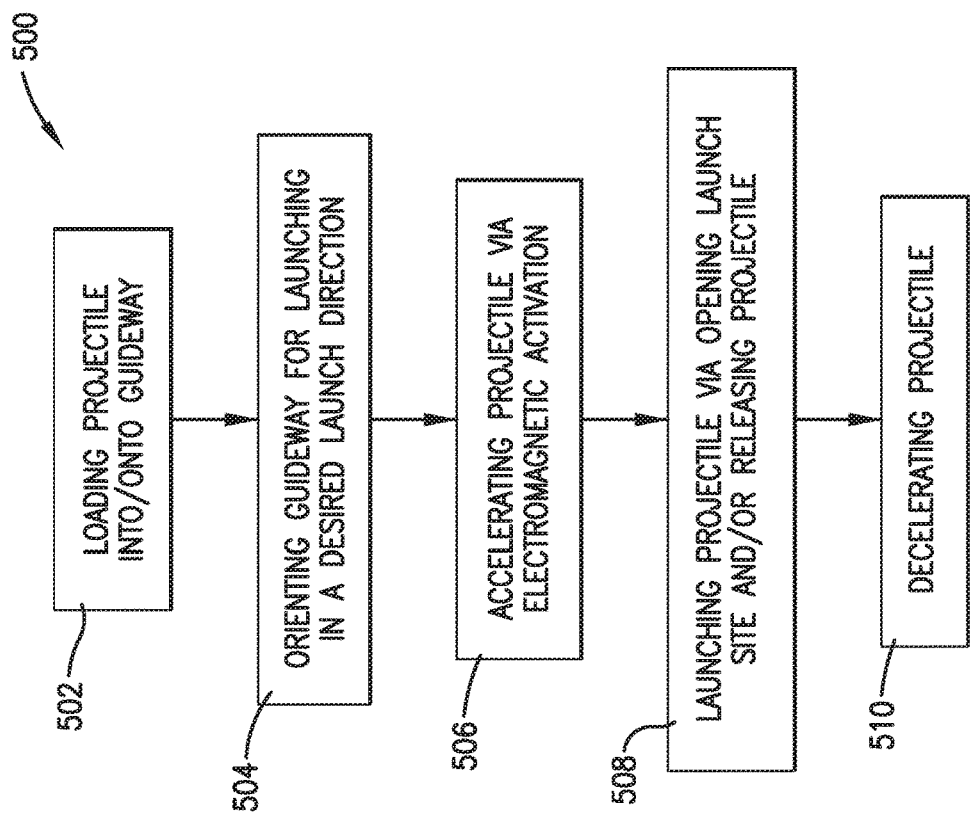
FIG. 5 is a flow chart of a method of launching a projectile in accordance with an embodiment of the present invention.

The flow chart of FIG. 5 depicts the steps of an exemplary method 1000 for electromagnetically launching the projectile 14 using the guideway 12 to allow for maximum acceleration of the projectile 14 and minimal space consumption. In some alternative implementations, the functions noted in the various blocks may occur out of the order depicted in FIG. 5. For example, two blocks shown in succession in FIG. 5 may in fact be executed substantially concurrently, or the blocks may sometimes be executed in the reverse order depending upon the functionality involved. Some or all of the steps described below and illustrated in FIG. 5 may also represent executable code segments stored on the computer-readable medium described above and/or executable by the controller 28.

The method 500 may comprise a step of loading the projectile 14 into the guideway 12, as depicted in block 502. The loading may be done through the launch site 18 or through another entrance/aperture of the guideway 12. The loading may be accomplished through the use of actuators 40, such as the actuators 40 described above, and/or may be performed manually via a user of the launcher 10. Next, the method 500 may include a step of orienting the guideway 12 so that the projectile 14 will launch out of the launch site 18 in a desired direction, as depicted in block 504. The orienting of the guideway 12 may be accomplished using actuators 40, such as the actuators 40 described above, and/or may be performed manually via a user. For example, the actuators 40 may rotate the guideway 12 in a clockwise or counter-clockwise direction, tilt the guideway 12 in any direction, move the guideway 12 vertically up, down, or horizontally, and/or allow the guideway 12 to be orientable so that the projectile 14 may be launched in any direction.

Next, the method 500 may include a step of accelerating the projectile 14, as depicted in block 506. This method step may be accomplished by activating the contact system 30, activating individual contacts 34 of the stator coils 26 connected to a bus, or activating the launcher 10 in other ways that create an electromagnetic field. Specifically, the activation may create an electromagnetic field along the guideway 12 causing an electromagnetic force to act upon the projectile 14, causing the projectile 14 to accelerate along the guideway. This acceleration of the projectile 14 may be continued until the desired speed is accomplished, or for a desired length of time as commanded via the controller 28. The controller 28 may use sensors to detect the speed of the projectile 14 and determine whether the projectile 14 is at its desired speed.

Next, the method 500 may include a step of launching the projectile 14, as depicted in block 508. This may include opening the launch site 18 on a wall of the guideway 12 that is tangentially pointed in the desired direction. The opening of the launch site 18 may be accomplished through actuators 40, as described above, or by any other opening trigger known in the art and dependent on the speed of the projectile 14. In some embodiments of the invention, the projectile 14 may further comprise an object that is releasably attached to the projectile 14 or to a sled, which—during this step—is released from the projectile 14 so that the object is launched tangent to the guideway 12 in the desired direction. This may make launching a projectile such as a bullet easier, because only a small opening would be needed.

Additionally or as an alternative to step 508, the method 500 may include a step of decelerating the projectile 14, as depicted in block 510. This may be accomplished through switching polarities of the electromagnetic field of the launcher 10 and/or the projectile 14. The switching of the polarities may be done through changing the configuration or polarity of the contacts 34, changing the wiring of the projectile 14 or stator coils 26, or changing the configuration of the power supply 16. In some embodiments of the invention, a user may command the controller 28 via a user interface to decelerate the projectile, or the controller 28 may be programmed to decelerate the projectile after a particular trigger such as a certain amount of time passing and/or a certain threshold speed achieved.

Projectile Outside of Helical Guideway

In other embodiments of the invention, as illustrated in FIGS. 6-8, an electromagnetic launcher 110 may have many of the same features as the electromagnetic launcher 10 described above, including a guideway 112 and stator coils 126 for accelerating a rotor 114, similar to the guideway 12, the stator coils 26, and the projectile 14 described above, respectively. However, the rotor 114 may be configured to accelerate along an outside of the guideway 112. Specifically, the rotor 114 may comprise a hollow cylinder with a radius larger than the guideway 112 so that the rotor 114 travels along the outside of the guideway 112, as illustrated in FIGS. 6-8. The rotor 114 may include a solid object with rotor coils 138 similar or identical to the solid object and rotor coils 138 described above. In some embodiments of the invention, the rotor coils 138 may be positioned along an inner surface of the rotor 114, and the stator coils 126 may be positioned along an outer surface of the guideway 112. A gap 144 formed from one end to another end of the rotor 114 may provide a flexible opening through which the rotor 114 may be flexed to initially be placed around the guideway 112. However, other methods of loading the rotor 114 onto the guideway 112 may be used without departing from the scope of the invention. Although not shown herein, the electromagnetic launcher 110 may also include contacts, actuators, a power source, and/or a controller similar and/or identical to the contacts 32, actuators 40, power source 16, and/or a controller 28 described above.

One example use of the electromagnetic launcher 110 is as an actuator for a fan or propeller blade. Specifically, the guideway 112 may be toroidal shaped, with the rotor 114, or additional rotors (e.g., four rotors), traveling along an outside of the guideway 112. The rotor 114 or rotors may each have a fan or propeller blade (not shown) attached thereto, either extending within a radius of the guideway 112 and/or extending radially outward from the guideway 112. In one embodiment of the invention, each of the fan or propeller blades may extend radially inward and meet together at a radial center of the guideway 112. The fan or propeller blade may be actuated by the movement of the rotor 114. In this embodiment, the rotors 114 may be propelled by the launcher 110 which in turn may cause the fan or propeller blades to travel in a circular path. Variations of this embodiment may be used in compressors, pumps, fans, high speed propellers, or turbines/compressors of jet engines to rotate or otherwise actuate various components via the rotors 114.

Spiral-Shaped Embodiment

In another example embodiment of the invention, as illustrated in FIG. 9, an electromagnetic launcher 210 may be similar to the electromagnetic launcher 10 described above, except that a guideway 212 thereof is spiral-shaped instead of toroidal, with an increasing radius 222. In some embodiments of the invention, the spiral-shaped guideway 212 may also have a vertical slope as the radius 222 increases, forming a funnel-like shape. In some embodiments of the invention, the spiral-shaped guideway 212 may also have a vertical slope upward with a constant radius 222, forming a helical helix. The vertical slope may be gradual or extreme and may also be a downward or upward slope. Note that the electromagnetic launcher 210 may have any or all of the components or features described above with respect to the electromagnetic launcher 10, but with the exceptions described herein. Thus, the electromagnetic launcher 210 may comprise the guideway 212, a controller, stator coils 226, contacts, actuators, and a launch site similar or identical to the guideway 12, the controller 28, the stator coils 26, the contacts 34, the actuators 40, and the launch site 18, respectively. In one embodiment of the invention, as illustrated in FIG. 9, the launch site may be located at a point where the radius 222 of the guideway 212 is at its maximum, and consists of a door, opening, port, aperture, or any other openable component.

As also illustrated in FIG. 9, a projectile 214 to be launched by the launcher 210 may also be similar or identical to the projectile 14 described above. In some embodiments of the invention, the projectile 214 may comprise a permanent magnet that levitates within the guideway 212. The stator coils 226 may include a plurality of single loops, each being individually connectable via their corresponding contacts to a bus connected to a DC power supply.

In use, the projectile 214 may be loaded through the launch site of the electromagnetic launcher 210 or through an entrance/aperture to the spiral-shaped guideway 212 where the radius 222 is at its minimum. Then, the controller of the electromagnetic launcher 210 may command one of the actuators thereof to orient the guideway 210 in a desired position so that the launch site at the end of the spiral guideway 212 points in a desired direction. The controller may then sense a location of the projectile 214 and activate the stator coils 226 near the projectile 214, causing the projectile to accelerate inside the guideway 212. The controller may continue sensing the location of the projectile 214 along the guideway 212 and activating the stator coils 226 near the projectile 214, causing the projectile 214 to continue accelerating until the projectile 214 exits the guideway 212 at the launch site (e.g., the end of the spiral guideway 212) in the desired direction and at a desired speed.

Multiple Coil Pairs Embodiment

Figure 10:
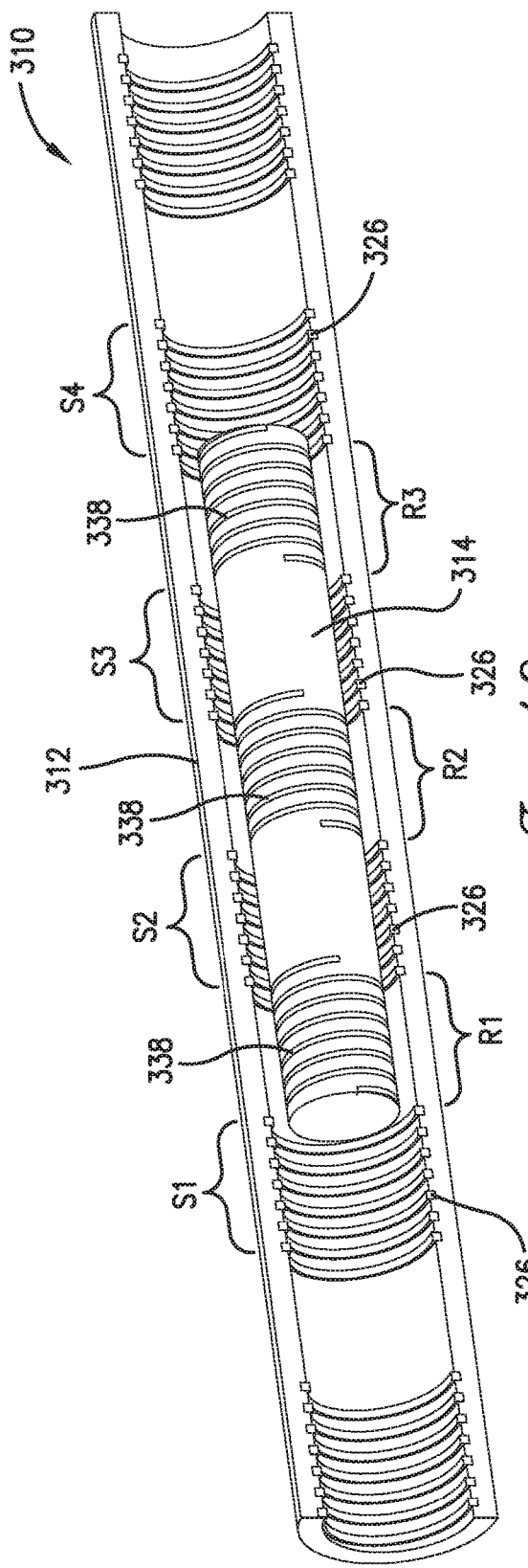
FIG. 10 is a top view of an electromagnetic launcher having multiple coil pairs according to another embodiment of the present invention.
Figure 11:
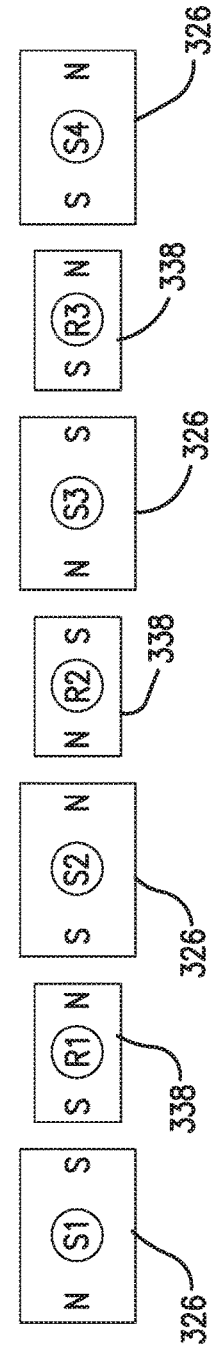
FIG. 11 is a schematic view of alternating polarities of coil pairs of the electromagnetic launcher of FIG. 10.

In another embodiment of the invention, as illustrated in FIG. 10-11, an electromagnetic launcher 310 similar to the electromagnetic launcher 10 above may include a guideway 312 and multiple stator coils 326 for launching a projectile 314, similar to the guideway 12, stator coils 26, and projectile 314 described above, respectively. The multiple stator coils 326 may interact with multiple rotor coils 338, similar to the rotor coils 38 above. In one exemplary embodiment, as illustrated in FIG. 10, there may be four sets of stator coils 326 (S1, S2, S3, S4) that interact with three sets of rotor coils 338 (R1, R2, R3). The stator coils 326 may use a contact system, similar to the contact system 30 above, to power only the stator coils 326 near the projectile 314, or the stator coils 326 may be selectively activated by a controller similar to the controller 28 above. Alternatively, there may be one stator coil 326 that winds around the guideway 312, and only sections of the stator coil 326 are activated by the contact system or controller. The rotor coils 338 may be powered using an internal power source (e.g., a battery) or through the contact system. As shown in FIGS. 10-11, the stator coils 326 and rotor coils 338 are configured to activate in a way such that the first stator coil S1 pushes the first rotor coil R1; the second stator coil S2 pulls the first rotor coil R1 while also pushing the second rotor coil R2; the third stator coil S3 pulls the second rotor coil R2 while pushing the third rotor coil R3; and the fourth stator coil S4 pulls the third rotor coil R3. This is further demonstrated by the alternating polarities of these rotor/stator coil pairs, as schematically illustrated in FIG. 11. Thus, the force applied to the projectile 314 is enhanced as it travels along the guideway 312. The guideway 312 may be a toroidal or spiral shaped in this embodiment of the invention.

Other Example Uses

Figure 12:
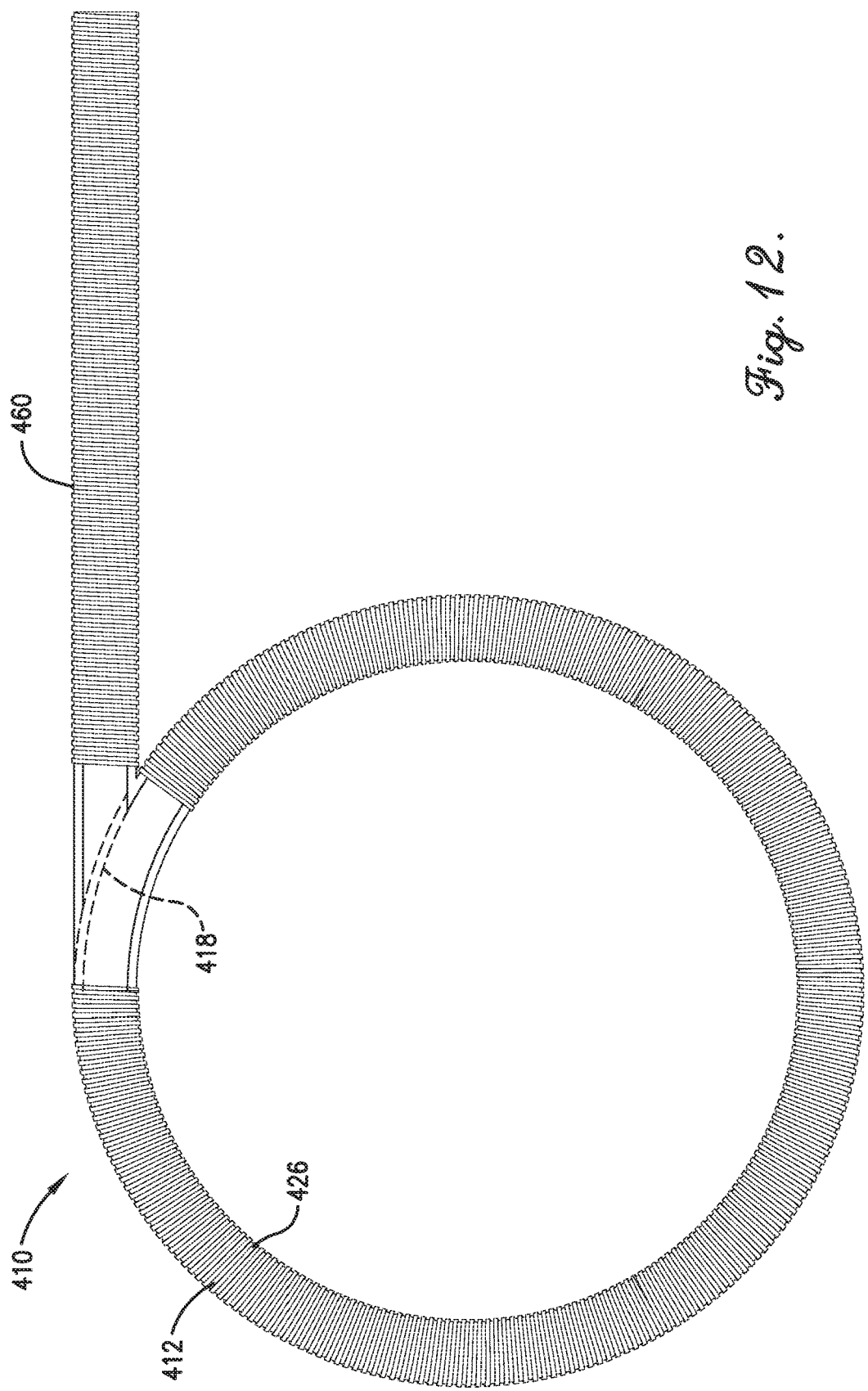
FIG. 12 is a schematic view of an electromagnetic launcher, in accordance with one embodiment of the present invention, having a configuration for use in a tank.

In one embodiment of the invention, as illustrated in FIG. 12, an electromagnetic launcher 410, similar to the electromagnetic launcher 10, may be utilized on a tank (not shown) in which a circular guideway 412 with stator coils 426 is placed, similar to the guideway 12 and the stator coils 26 described above. The electromagnetic launcher 410 may additionally include or be attached to a barrel 460 tangentially attached to the circular guideway 412, wherein the barrel 460 also has stator coils 426. At a connection point of the barrel 460 and the circular guideway 412, there may be an internal door 418 that connects an internal channel of the guideway 412 to an internal channel of the barrel 460. The tank may be configured to launch a projectile or multiple projectiles at high speeds from the barrel 460 of the tank. The circular guideway 412 may accelerate the projectile or projectiles until a desired speed is achieved, or once the barrel 460 is pointed in a desired direction. The door 418 may then open, allowing the projectile or projectiles to travel through an opening of the door 418 into the barrel 460 tangent to the circular guideway 412, and out an end of the barrel 460 in the desired direction at the desired speed. Similar configurations may be used for airplanes, submarines, or other vehicle implementations. Likewise, smaller versions could be used for handheld guns or artillery launchers. Furthermore, there could be a number of circular or spiral electromagnetic launchers similar to 410 that are combined to share a single exit or launch site with each other.

In another example use of the invention, as illustrated in FIG. 13, an electromagnetic launcher 510 is similar to the electromagnetic launcher 10 described above, except that the electromagnetic launcher 510 comprises two guideways: an inner guideway 512 and an outer guideway 513. The inner guideway 512 may be located within the outer guideway 513. A projectile 514, similar to the projectile 14 above, may extend substantially circumferentially around the inner guideway 512 and be positioned within the outer guideway 513. Thus, the projectile 514 may be configured to travel along the outside of the inner guideway 512, but along an inside of the outer guideway 513.

In use, a power source (not shown) may provide power to a contact system, similar to any of the embodiments described above, such that the contacts thereof provide current to rotor coils 538 on the projectile 514 and stator coils 526 on the guideways 512,513, inducing electromagnetic fields. The use of the two guideways 512,513 may greatly increase the electromagnetic propulsion of the projectile 514 caused by their respective electromagnetic fields. The electromagnetic launcher 510 as described herein could be used in a variety of applications, such as in handheld and mounted weapons systems.

In another example use of the invention (not shown), a circular guideway, such as the guideway 12 described above, may be used to accelerate the projectile 14 until the projectile 14 achieves a speed sufficient to burst through a wall of the guideway 12, causing an explosion.

Other applications for various embodiments of the invention described above may include but are not limited to: turbo internal vehicle transportation, horizontal-transportation, vertical-transportation such as rollercoasters, and high speed rotary motors for propulsion on aircraft, submarines, and the like. Furthermore, as noted above, the projectiles and rotors described herein may take numerous forms for different applications including but not limited to a bullet, artillery shell, missile, transportation vehicle, aircraft, spacecraft, or amusement park ride. In one example application, one or more of the electromagnetic launcher disclosed herein may be used to launch an object or projectile configured for stopping (collide with and/or catch) incoming missiles, projectiles, or asteroids.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An electromagnetic launcher comprising:
   an inner guideway having a plurality of conductive coils configured to produce a first electromagnetic field around its circumference; and
   an outer guideway positioned circumferentially around the inner guideway and radially spaced apart from the inner guideway so that a projectile can pass between the inner guideway and the outer guideway, the outer guideway having a plurality of conductive coils configured to produce a second electromagnetic field within the outer guideway.

2. The electromagnetic launcher of claim 1, further including a controller configured to selectively activate the conductive coils of the inner guideway and the conductive coils of the outer guideway.

3. The electromagnetic launcher of claim 2, wherein the controller is coupled to a multiplexer that enables the activation of the conductive coils of the inner guideway and the conductive coils of the outer guideway.

4. The electromagnetic launcher of claim 1, further comprising a projectile that is movably retained between the inner guideway and the outer guideway, wherein the projectile is configured to be propelled by the first electromagnetic field and the second electromagnetic field.

5. The electromagnetic launcher of claim 4, wherein the projectile includes a plurality of conductive coils configured to generate a projectile electromagnetic field.

6. The electromagnetic launcher of claim 4, wherein the projectile is made of a magnetic material.

7. The electromagnetic launcher of claim 4, wherein the projectile is made of conductive material so that it responds to the first electromagnetic field and the second electromagnetic field.

8. The electromagnetic launcher of claim 4, further comprising a pair of power rails including a positive rail and a negative rail that are positioned between the inner guideway and the outer guideway, and a set of outer guideway connectors attached to the projectile and having a first outer guideway connector configured to connect a first point of the conductive coils of the outer guideway to the positive rail and a second outer guideway connector configured to connect a second point of the conductive coils of the outer guideway to the negative rail so that power travels from the pair of power rails to a portion of the conductive coils of the outer guideway proximate to the projectile thereby generating the second electromagnetic field.

9. The electromagnetic launcher of claim 8, further including a set of inner guideway connectors attached to the projectile and having a first inner guideway connector configured to connect a first point of the conductive coils of the inner guideway to the positive rail and a second inner guideway connector configured to connect a second point of the conductive coils of the inner guideway to the negative rail so that power travels from the pair of power rails to a portion of the conductive coils of the inner guideway proximate to the projectile thereby generating the first electromagnetic field.

10. The electromagnetic launcher of claim 5, further comprising a pair of power rails including a positive rail and a negative rail that are positioned between the inner guideway and the outer guideway, and a set of projectile connectors attached to the projectile and having a first projectile connector configured to connect a first point of the conductive coils of the projectile to the positive rail and a second projectile connector configured to connect a second point of the conductive coils of the projectile to the negative rail so that power travels from the pair of power rails to a portion of the conductive coils of the projectile thereby generating the projectile electromagnetic field.

11. The electromagnetic launcher of claim 5, wherein the projectile further includes an energy storage device that provides power to the conductive coils of the projectile.

12. The electromagnetic launcher of claim 11, wherein the energy storage device provides power to a portion of the conductive coils of the inner guideway and a portion of the conductive coils of the outer guideway.

13. The electromagnetic launcher of claim 9, wherein the inner guideway connectors and the outer guideway connectors include conductive bearings to reduce friction between the projectile and the inner guideway, the outer guideway, and the pair of power rails.

14. The electromagnetic launcher of claim 4, wherein the projectile is a sled that launches an object held in the sled.

15. The electromagnetic launcher of claim 1, wherein the inner guideway and the outer guideway form a conical spiral path.

16. An electromagnetic launcher comprising:
an inner guideway having a plurality of conductive coils configured to produce a first electromagnetic field around its circumference;
an outer guideway positioned circumferentially around the inner guideway and radially spaced apart from the inner guideway so that a projectile can pass between the inner guideway and the outer guideway, the outer guideway having a plurality of conductive coils configured to produce a second electromagnetic field along the inner guideway; and
a tubular projectile that is movably retained along the inner guideway and that is responsive to the first electromagnetic field and the second electromagnetic field.

17. The electromagnetic launcher of claim 16, further including a controller configured to selectively activate the conductive coils of the inner guideway and the conductive coils of the outer guideway.

18. The electromagnetic launcher of claim 16, wherein the controller is configured to reverse polarities of the first electromagnetic field and the second electromagnetic field so that the tubular projectile decelerates.

19. An electromagnetic launcher comprising:
an inner guideway having a plurality of conductive coils configured to produce a first electromagnetic field around its circumference;
an outer guideway positioned circumferentially around the inner guideway and radially spaced apart from the inner guideway so that a projectile can pass between the inner guideway and the outer guideway, the outer guideway having a plurality of conductive coils configured to produce a second electromagnetic field along the inner guideway;
a tubular projectile that is movably retained along the inner guideway that is responsive to the first electromagnetic field and the second electromagnetic field, the tubular projectile having a plurality of conductive coils configured to produce a projectile electromagnetic field;
a pair of power rails including a positive rail and a negative rail that are positioned between the inner guideway and the outer guideway;
a first set of connectors attached to the projectile and having a first connector configured to connect a first point of the conductive coils of the inner guideway to the positive rail and a second connector configured to connect a second point of the conductive coils of the inner guideway to the negative rail so that power is transferred from the pair of power rails to a portion of the conductive coils of the inner guideway proximate to the projectile via the first set of connectors, thereby generating the first electromagnetic field;
a second set of connectors attached to the projectile and having a first connector configured to connect a first point of the conductive coils of the outer guideway to the positive rail and a second connector configured to connect a second point of the conductive coils of the outer guideway to the negative rail so that power is transferred from the pair of power rails to a portion of the conductive coils of the outer guideway proximate to the projectile via the second set of connectors, thereby generating the second electromagnetic field; and
a third set of connectors attached to the projectile and having a first connector configured to connect a first point of the conductive coils of the projectile to the positive rail and a second connector configured to connect a second point of the conductive coils of the projectile to the negative rail so that power is transferred from the pair of power rails to a portion of the conductive coils of the projectile via the third set of connectors, thereby generating the projectile electromagnetic field.

20. The electromagnetic launcher of claim 19, wherein the inner guideway, the outer guideway, and the pair of rails form a conical spiral path.

* * * * *